(12) United States Patent
Liu

(10) Patent No.: US 6,951,028 B2
(45) Date of Patent: Sep. 27, 2005

(54) CD INSERTING MECHANISM OF A CD PLAYER WITHOUT LOADING PLATE

(75) Inventor: Kuo-Cheng Liu, Taipei (TW)

(73) Assignee: Hanpin Electron Co., Ltd., Tainan (TW)

( * ) Notice: Subject to any disclaimer, the term of this patent is extended or adjusted under 35 U.S.C. 154(b) by 130 days.

(21) Appl. No.: 10/442,079

(22) Filed: May 21, 2003

(65) Prior Publication Data

US 2004/0237095 A1 Nov. 25, 2004

(51) Int. Cl.⁷ .............................................. G11B 17/04
(52) U.S. Cl. ...................................................... 720/719
(58) Field of Search ................................ 720/619, 624, 720/625, 620, 621, 622, 623

(56) References Cited

U.S. PATENT DOCUMENTS

| | | | | |
|---|---|---|---|---|
| 6,735,161 B1 | * | 5/2004 | Sato et al. | 720/621 |
| 6,772,426 B2 | * | 8/2004 | Akatani | 720/624 |
| 2003/0156507 A1 | * | 8/2003 | Seki et al. | 369/30.85 |
| 2003/0235131 A1 | * | 12/2003 | Kim et al. | 369/77.1 |

FOREIGN PATENT DOCUMENTS

| | | | | | |
|---|---|---|---|---|---|
| JP | 08180537 A | * | 7/1996 | | G11B/17/04 |
| JP | 11213506 A | * | 8/1999 | | G11B/17/04 |
| JP | 2001338456 A | * | 12/2001 | | G11B/17/04 |
| JP | 2002117602 A | * | 4/2002 | | G11B/17/04 |
| JP | 2003120776 A | * | 4/2003 | | F16H/19/04 |

* cited by examiner

*Primary Examiner*—William J Klimowicz
(74) *Attorney, Agent, or Firm*—Rosenberg, Klein & Lee

(57) ABSTRACT

A CD player is equipped with a CD inserting mechanism without loading plate; the CD inserting mechanism is equipped with single transmission gear set to be simple in structure and have reduced numbers of parts; the transmission gear set consists of a rubber roller, a tremor gear, and is a support; a belt is connected to a motor and the transmission gear set so that rotation of the motor can be passed on to the gear set; a compact disk will come into contact with the rubber roller to be conveyed towards inside of the CD player by means of the rubber roller after it is inserted into the inserting mechanism.

1 Claim, 13 Drawing Sheets

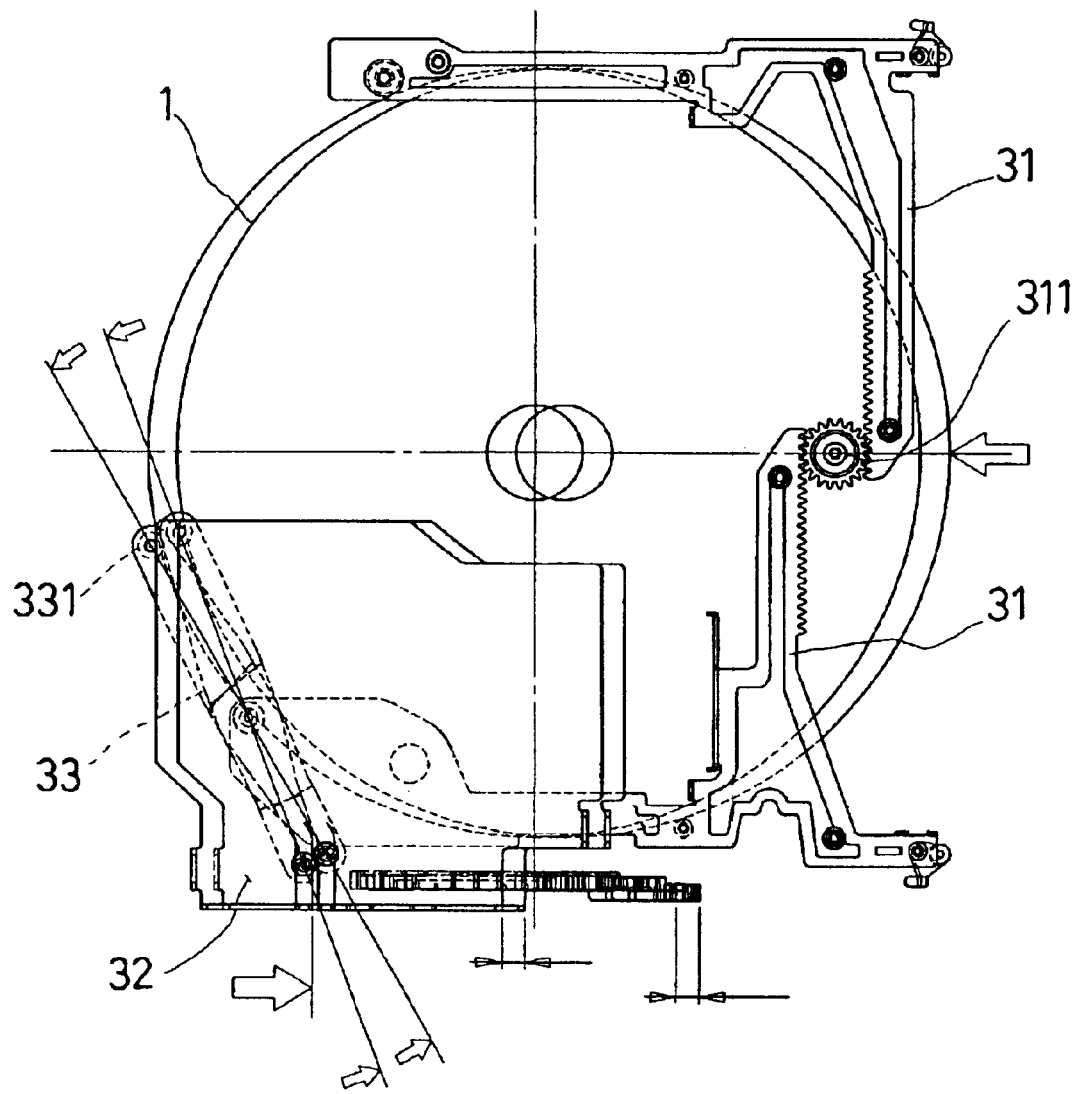
F I G. 5

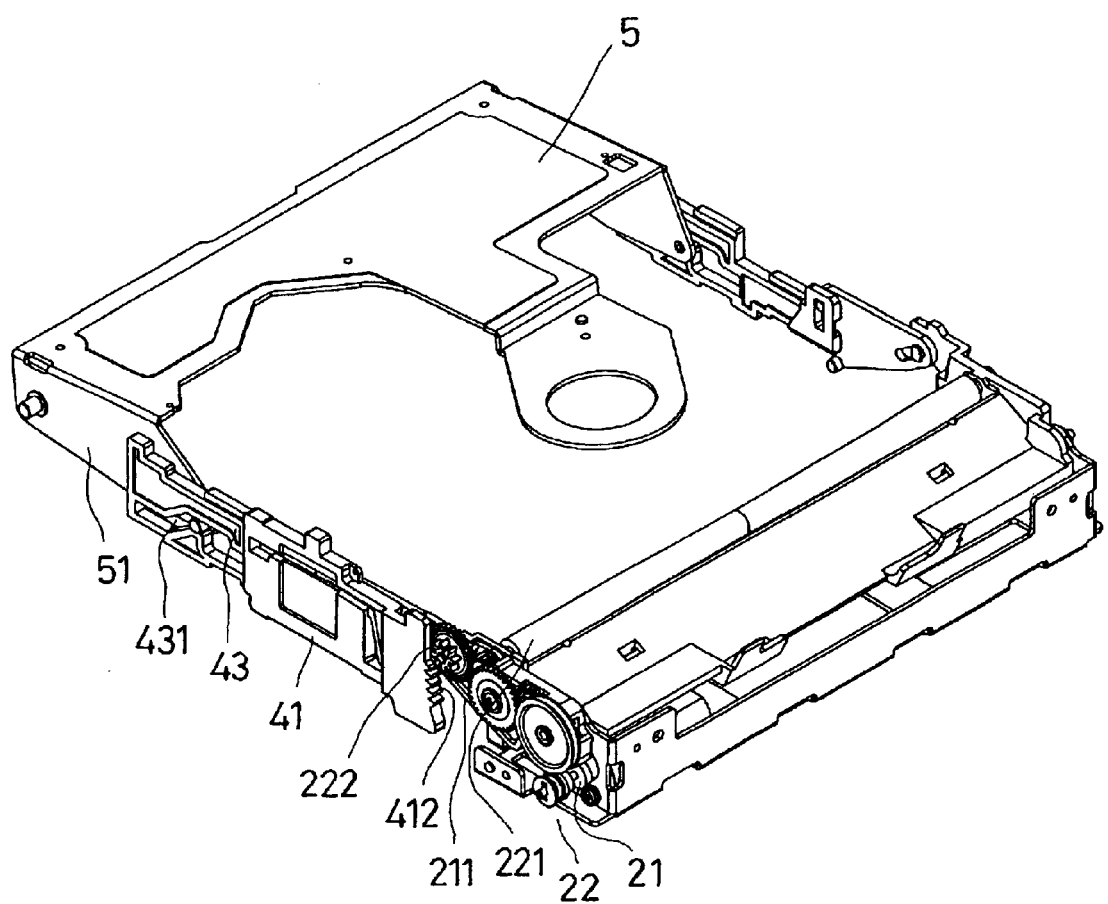
F I G. 8

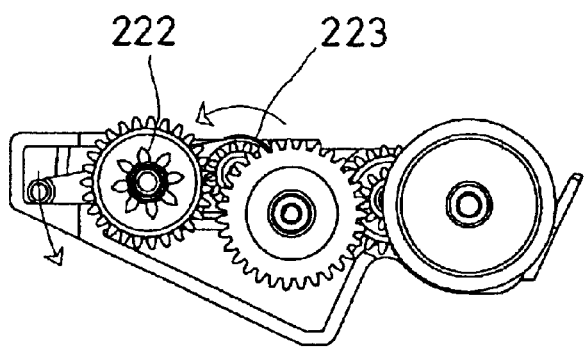
F I G. 10
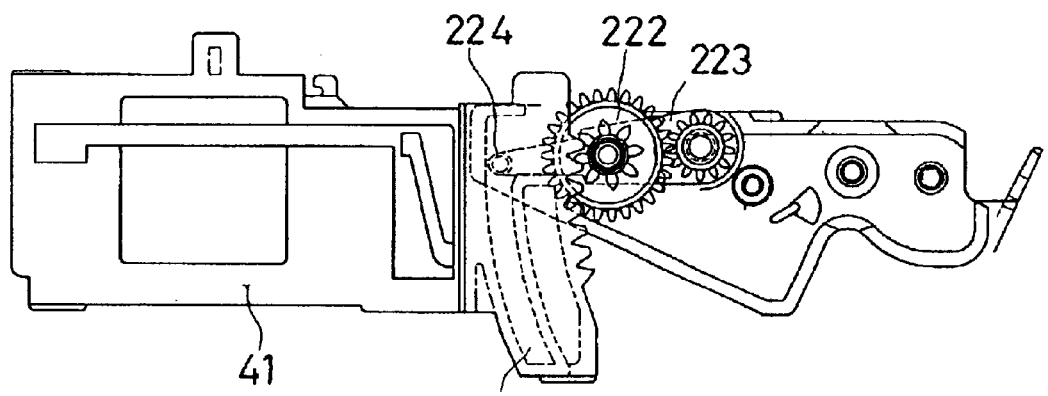
F I G. 11
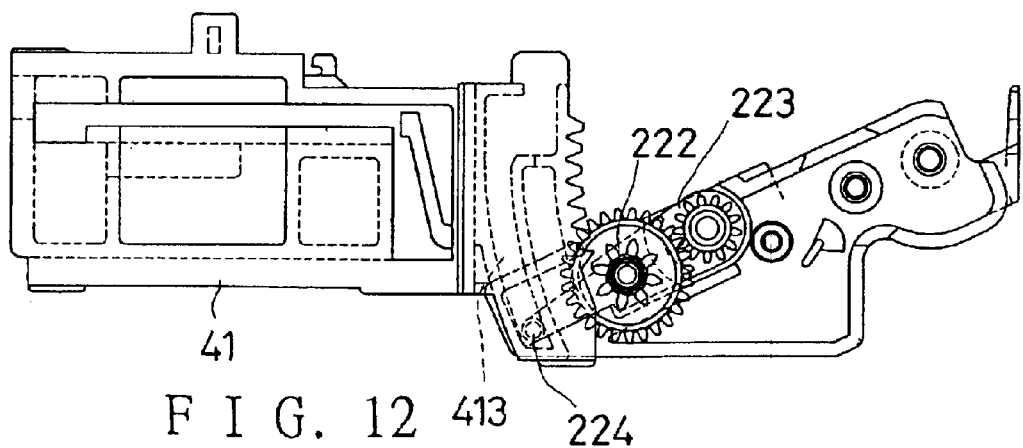
F I G. 12

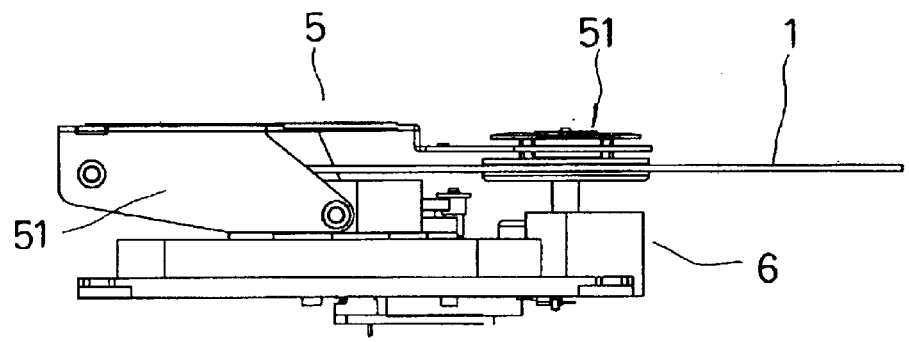
F I G. 17
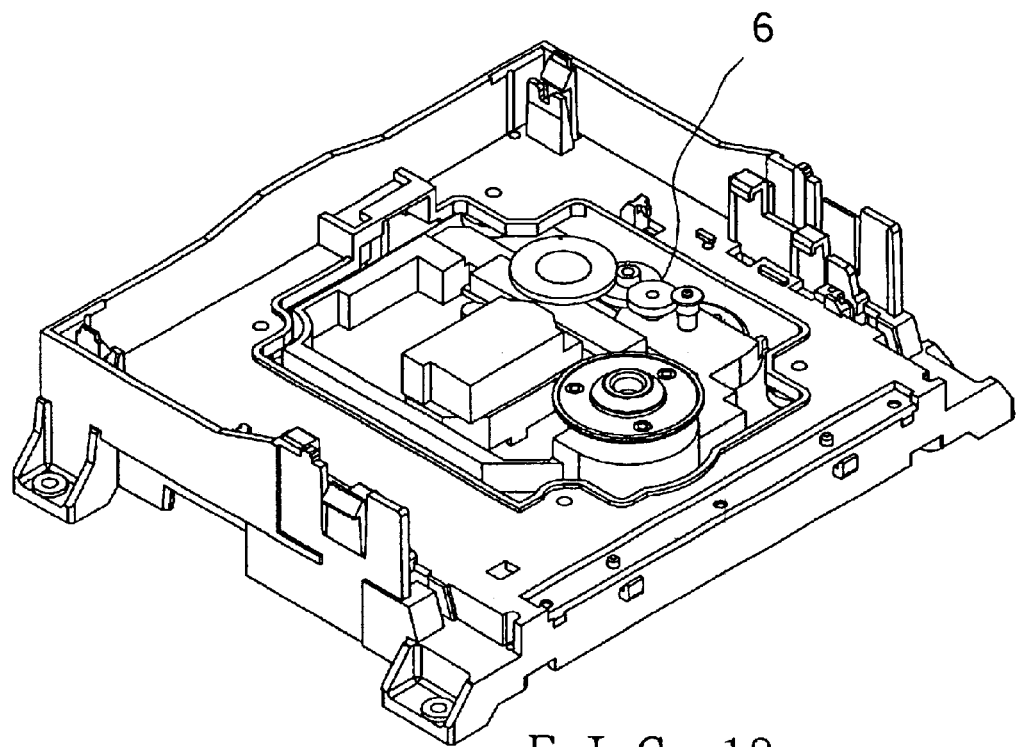
F I G. 18

CD INSERTING MECHANISM OF A CD PLAYER WITHOUT LOADING PLATE

BACKGROUND OF THE INVENTION

1. Field of the Invention

The present invention relates to a compact disk inserting mechanism of a CD player, more particularly one, which is not equipped with a loading plate for compact disks, and which is equipped with single transmission so as to be uncomplicated in structure, easy and less labor-costing to manufacturer, and of reduced faulty rate.

2. Brief Description of the Prior Art

Conventional CD inserting mechanisms of CD players are equipped with a loading plate for compact disks. Loading plates of this kind are usually controlled with at least one button. A button is pressed for making a loading plate slide out of a CD player, and then a compact disk is positioned on the loading plate, and the button is pressed again for making the loading plate slide into the CD player; thus, the compact disk is inserted into the player.

As can be easily seen, such way of inserting a CD into a player is not as convenient and time-saving as the way of inserting a CD into a player directly. In addition, with the above conventional inserting mechanism, the user has to make sure that a CD is positioned level on the loading plate, and that there is no objects in front of the outlet of the loading plate otherwise problems will probably be caused to loading of a CD.

Referring to FIGS. 19 to 22, a CD inserting mechanism of a CD player without use of a loading plate is developed, which includes a pulley 71, a first transmission device 72, a second transmission device 73, a cam sliding member 75, a rubber roller 76, and a CD securing member 77; the cam sliding member 75 has two guide slots formed with sloping sections 753, 754, through which a supporting post 761 of the rubber roller 76, and a supporting post 771 of the CD securing member 77 are respectively passed. Movement of a motor (not shown) is passed on to the pulley 71 by means of a belt connected to the pulley 71. The pulley 71 engages both a first reduction gear 721 of the first transmission device 72 and a first reduction gear 731 of the second transmission device 73 while the first reduction gear 721 effects rotation of both a second reduction gear 722 and an idle gear 723 of the first transmission device 72 such that the rubber roller 76 can be actuated to move a CD into the CD player.

Then, the second transmission device 73 cooperates with the cam sliding member 75 and the CD securing member 77 to move the CD to a final position in the CD player so that the CD is secured in position by means of the CD securing member 77; the first reduction gear 731 of the second transmission device 73 effects rotation of both a second reduction gear 732 and a third reduction gear 733 of the second transmission device 73 such that when the CD is moved to the final position, force exerted on the CD by the rubber roller 76 is greater than force exerted on the cam sliding member 75 by a spring 751 connected to the member 75, thus causing the cam sliding member 75 to slide, and toothed bar 752 of the cam sliding member 75 to engage the third reduction gear 733 of the second transmission device 73 accordingly; as a result of the last operation, the third reduction gear 733 effects movement of the cam sliding member 75, and in turns, the sloping sections 753, and 754 of the guide slots make the supporting posts 761, 771 move downwards along them respectively, and the rubber roller 76 becomes disengaged from the gear 723 to not turn any longer, and the CD securing member 77 moves downwards; thus, the rubber roller 76 stops moving the CD forwards, and a magnetic element (not shown) of the securing member 77 secures the CD in position, and a micro-switch is touched to make the motor stop.

The CD inserting mechanism is more convenient without the use of a conventional CD loading plate. However, a disadvantage of the CD inserting mechanism is that it is relatively complicated in structure; two transmission devices are used, and in turns, the CD player costs much labor to assemble, and faulty rate would increase in production as well as in use.

SUMMARY OF THE INVENTION

It is a main object of the present invention to provide a CD inserting mechanism of a CD player, which is not equipped with a loading plate for compact disks, and which is equipped with single transmission to be simple in structure, inexpensive and labor costing to manufacture.

The CD inserting mechanism has a transmission gear set, which is actuated with a motor, and which has a rubber roller for conveying a compact disk to an in-use position. The CD inserting mechanism is further equipped with a tracking toothed plate capable of being pulled to an active position by means of a first spring when a compact disk is inserted into the CD player, thus making a toothed portion thereof coming into engagement with a micro-adjusting gear of the transmission gear set, and making the transmission gear set moving downwards along circular path. An L-shaped lever is provided to transform the up and down movement into left and right movement, which is then imparted to a cam plate slide, when the transmission gear set is moving downwards along a circular path. The cam plate slide has slide trenches for making both a support of a CD securing mechanism and a CD securing base swing up and down on a course of the L-shaped lever transforming the up and down movement into left and right movement when the transmission gear set is moving downwards along a circular path; thus, the compact disk is held in position.

BRIEF DESCRIPTION OF THE DRAWINGS

The present invention will be better understood by referring to the accompanying drawings, wherein:

FIG. 5 is a horizontal sectional view of the CD inserting mechanism of a CD player in operation according to the present invention, FIG. 8 is another partial perspective view of the CD inserting mechanism of a CD player according to the present invention, FIG. 10 is another partial side view of the CD inserting mechanism of a CD player in operation, FIG. 11 is yet another partial side view of the CD inserting mechanism of a CD player in operation, FIG. 12 is a fourth partial side view of the CD inserting mechanism of a CD player in operation, FIG. 17 is a view showing a CD being secured with the mechanism of the present invention, FIG. 18 is a view of a CD reading mechanism of a CD player according to the present invention.

DETAILED DESCRIPTION OF THE PREFERRED EMBODIMENTS

Figure 1:
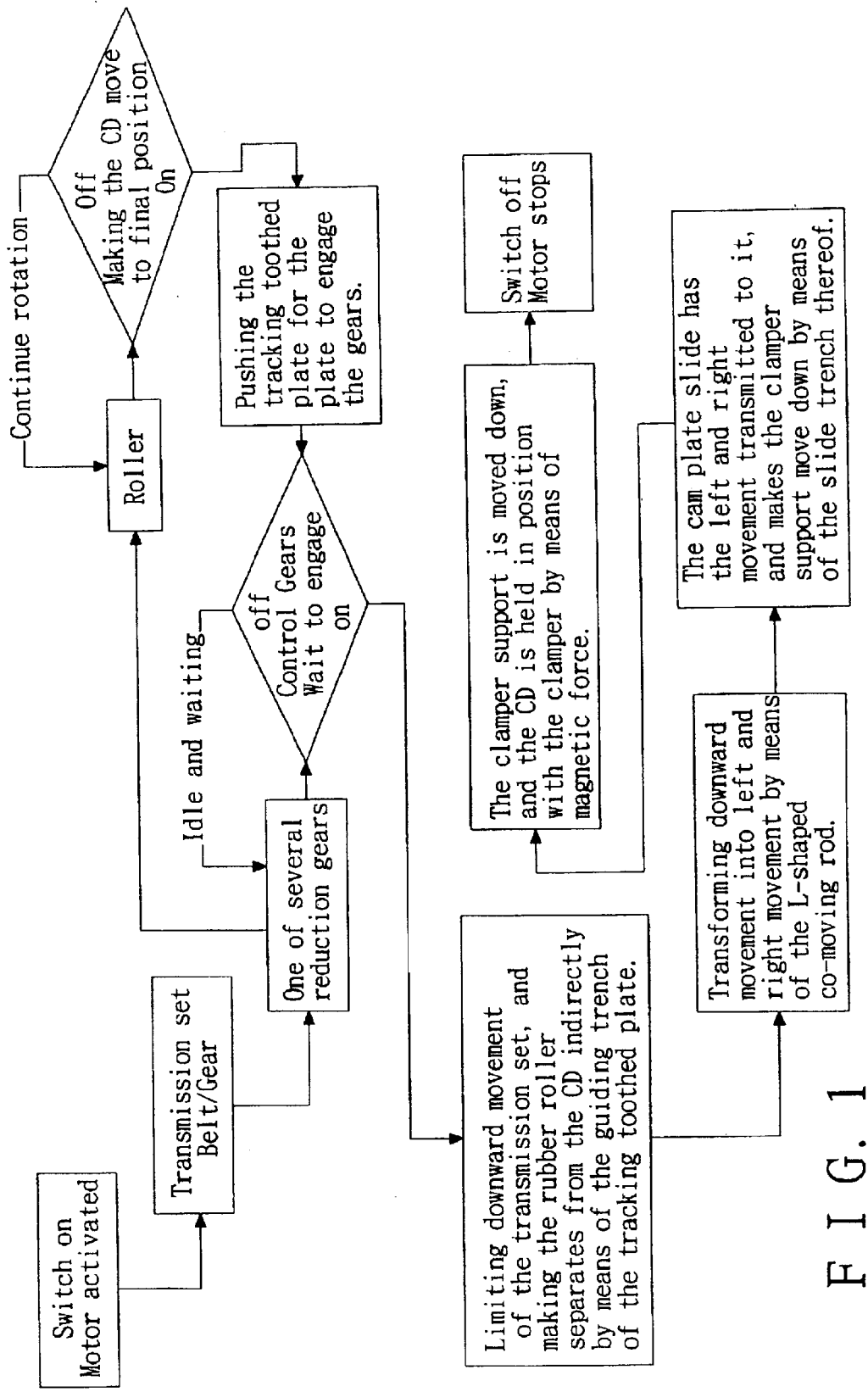
FIG. 1 is a flow chart of operation of the CD inserting mechanism of a CD player according to the present invention.
Figure 2:
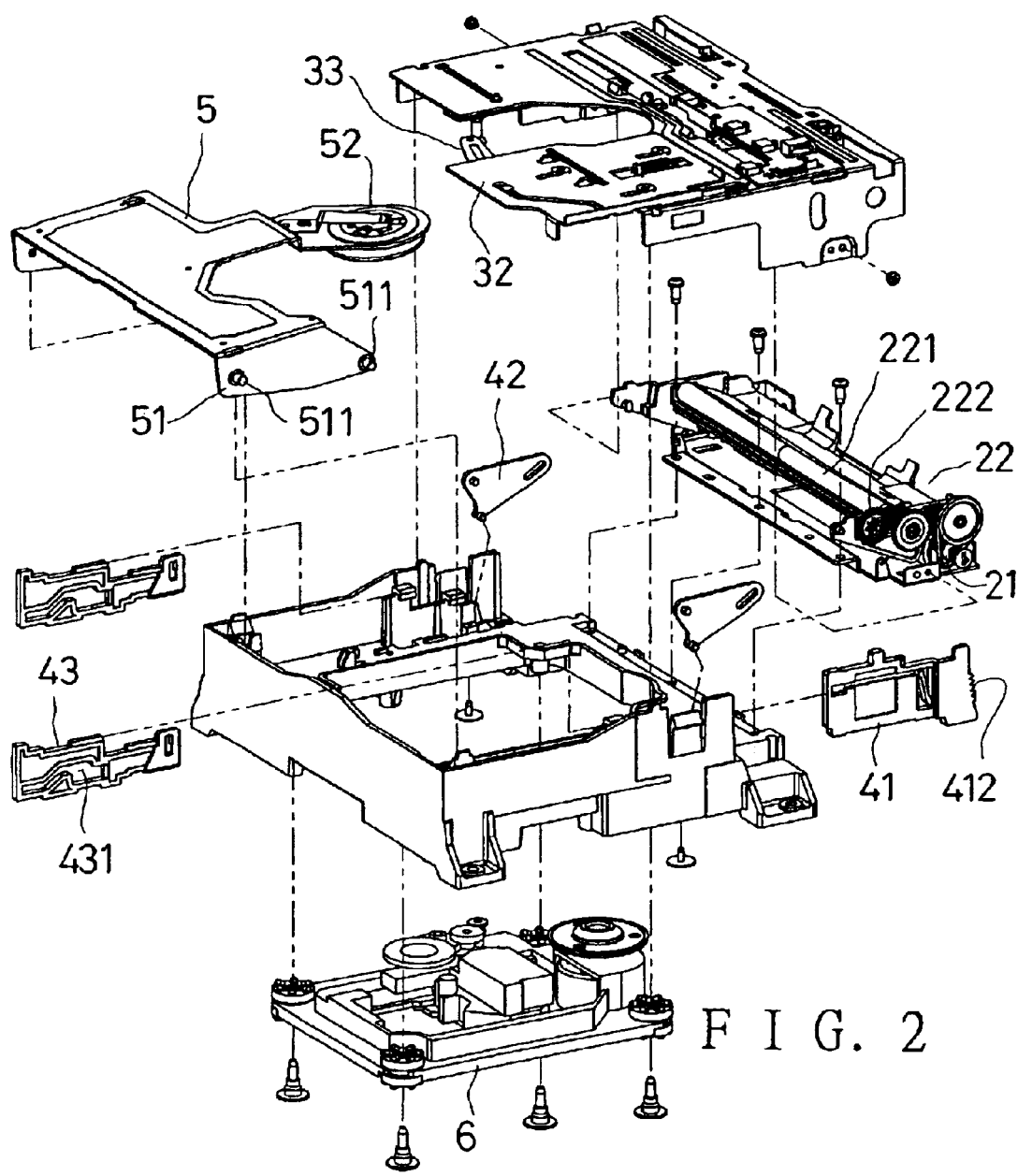
FIG. 2 is an exploded perspective view of the CD inserting mechanism of a CD player according to the present invention.
Figure 3:
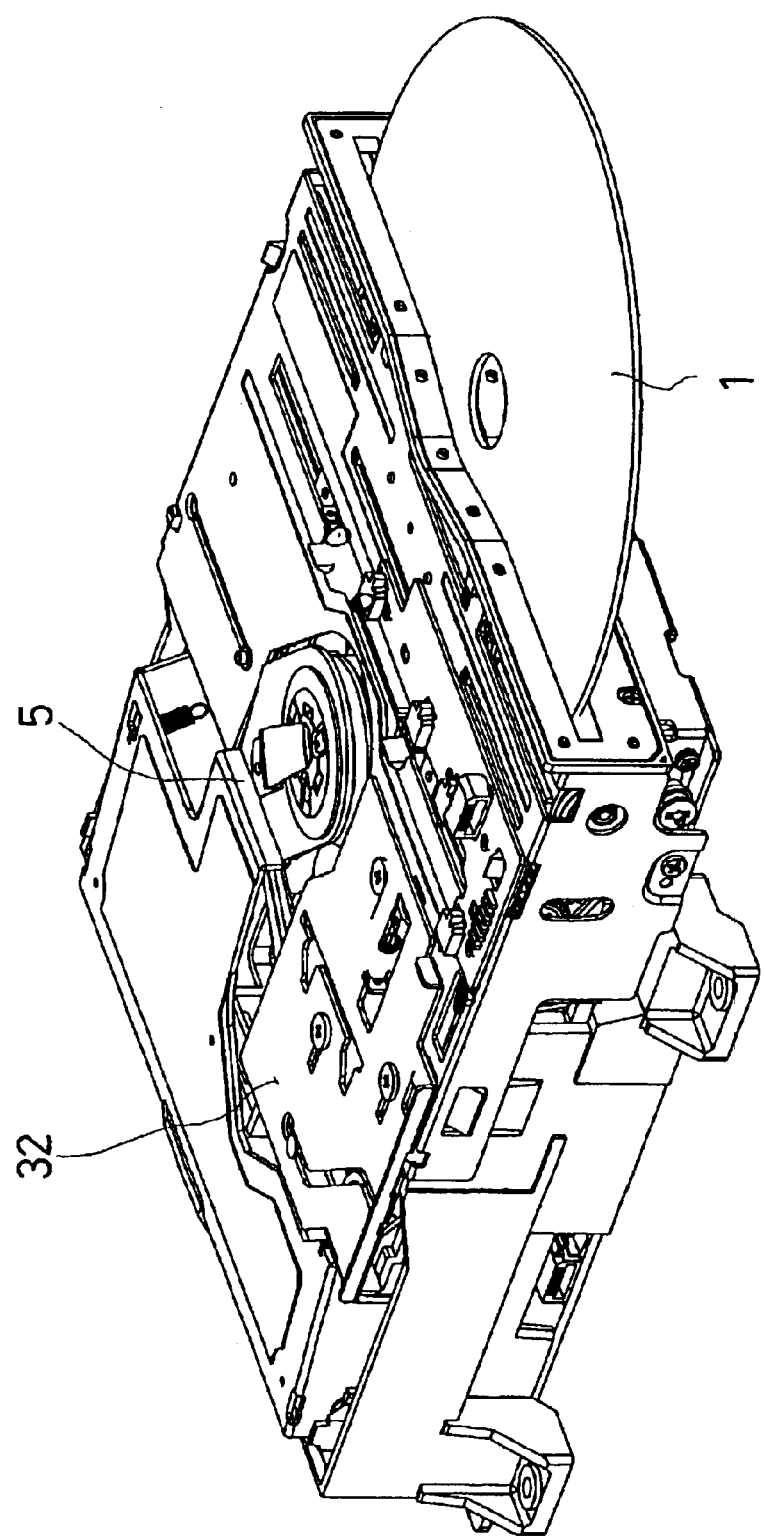
FIG. 3 is a perspective view of the CD inserting mechanism of a CD player according to the present invention.
Figure 4:
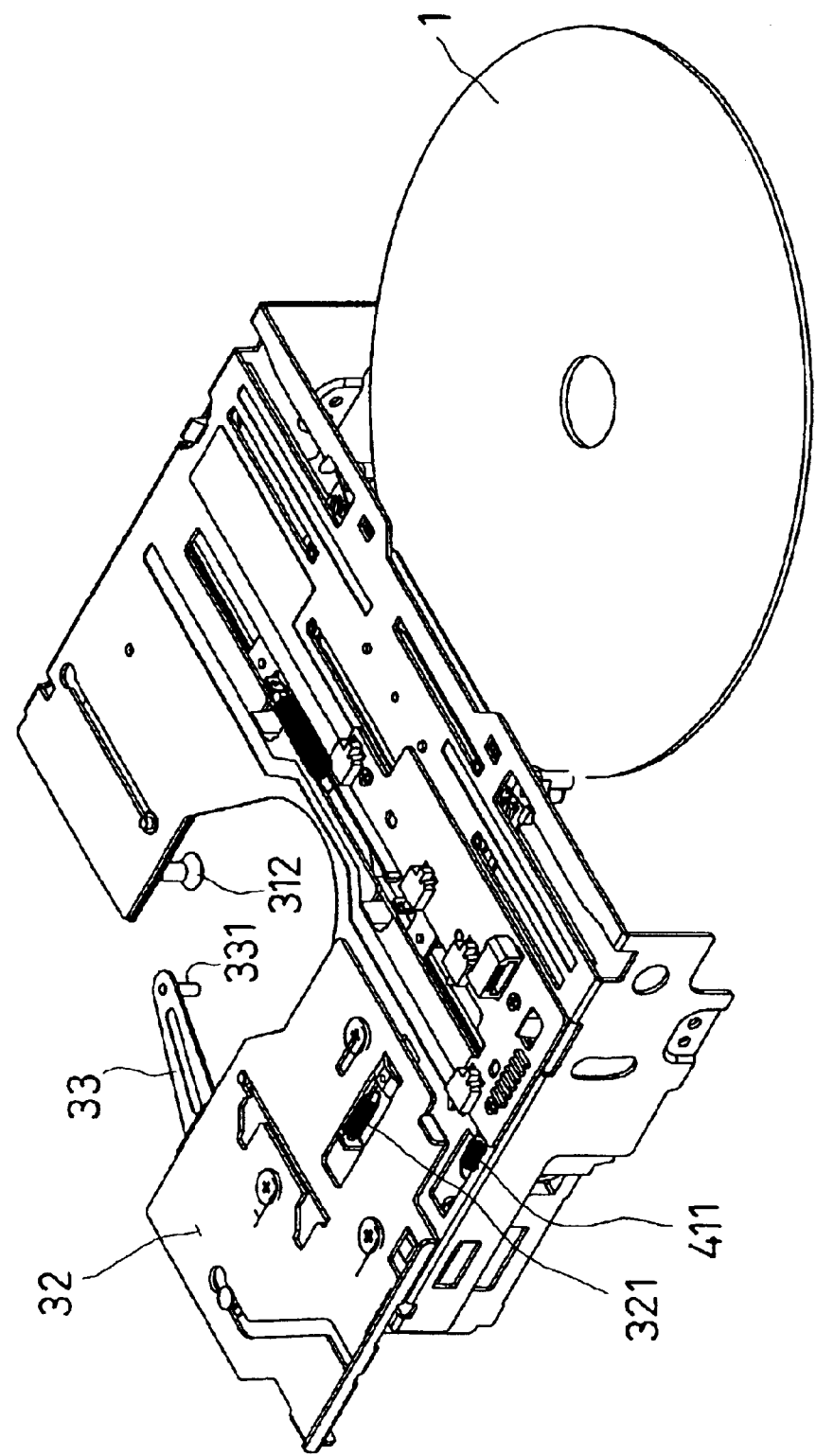
FIG. 4 is a partial perspective view of the CD inserting mechanism of a CD player according to the present invention.
Figure 6:
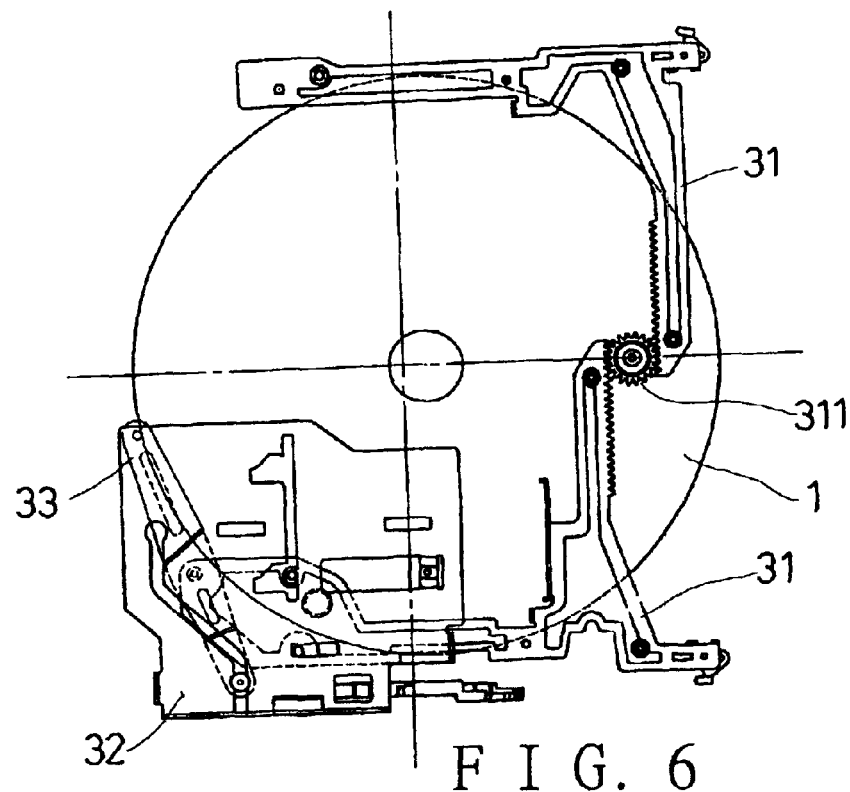
FIG. 6 is another horizontal sectional view of the CD inserting mechanism of a CD player in operation according to the present invention.
Figure 7:
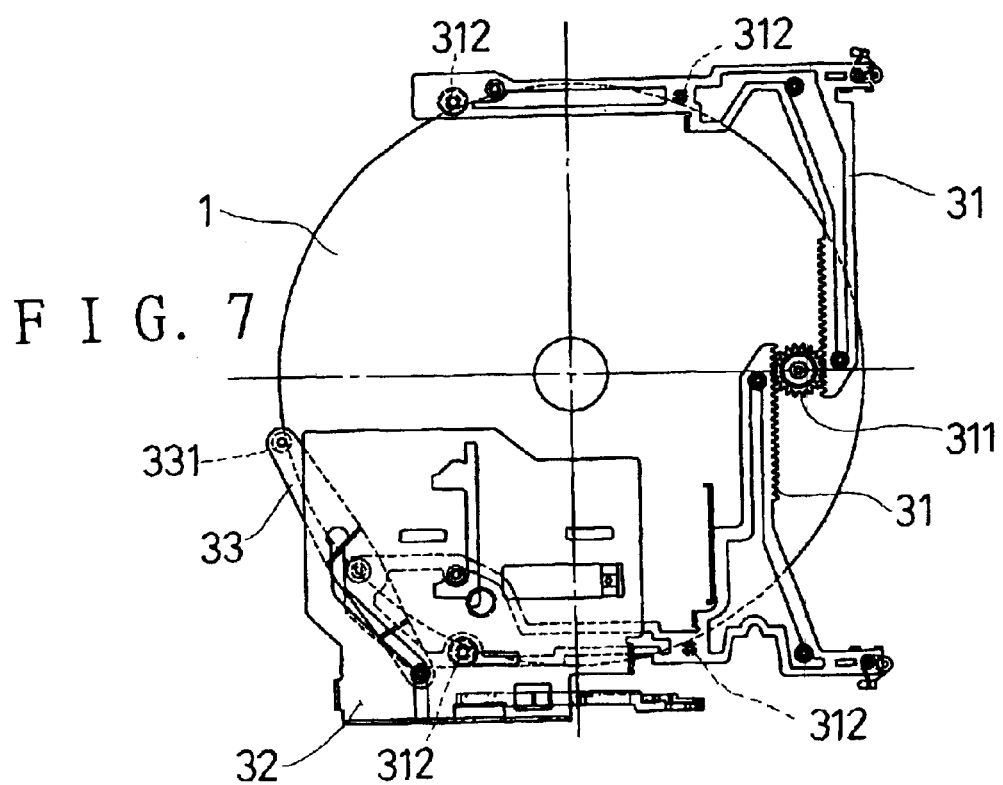
FIG. 7 is yet another horizontal sectional view of the CD inserting mechanism of a CD player in operation.
Figure 13:
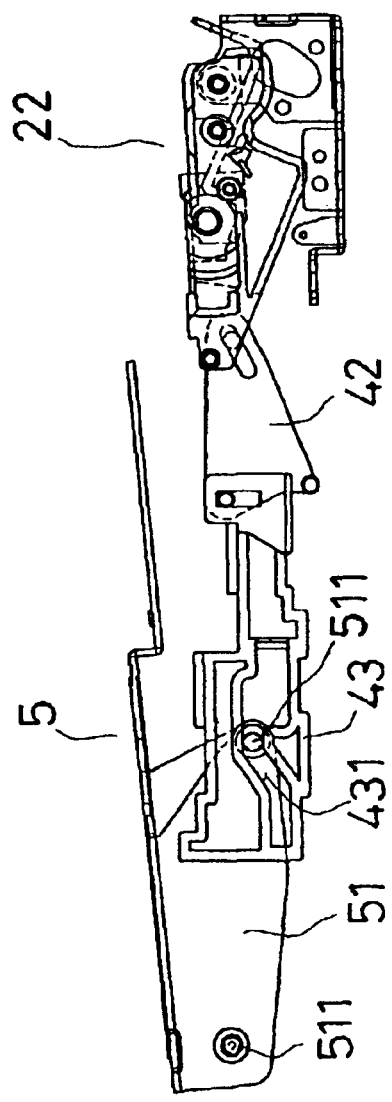
FIG. 13 is a fifth partial side view of the CD inserting mechanism of a CD player in operation.
Figure 14:
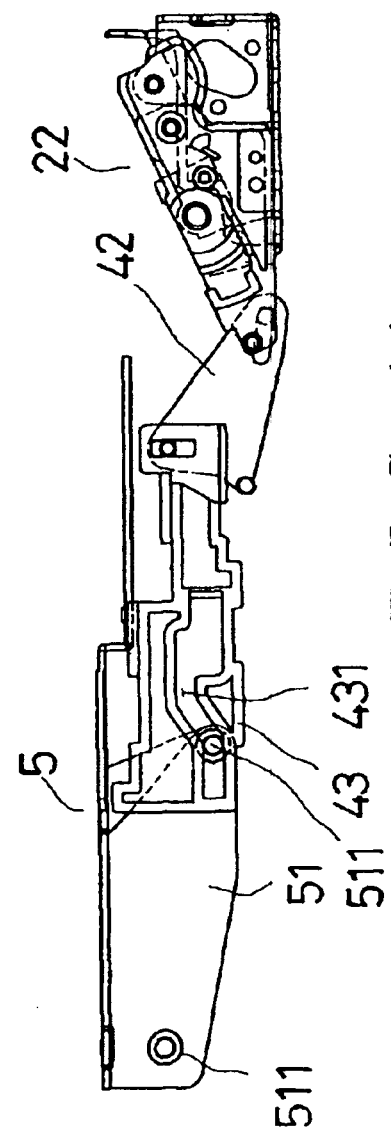
FIG. 14 is a sixth partial side view of the CD inserting mechanism of a CD player in operation.
Figure 19:
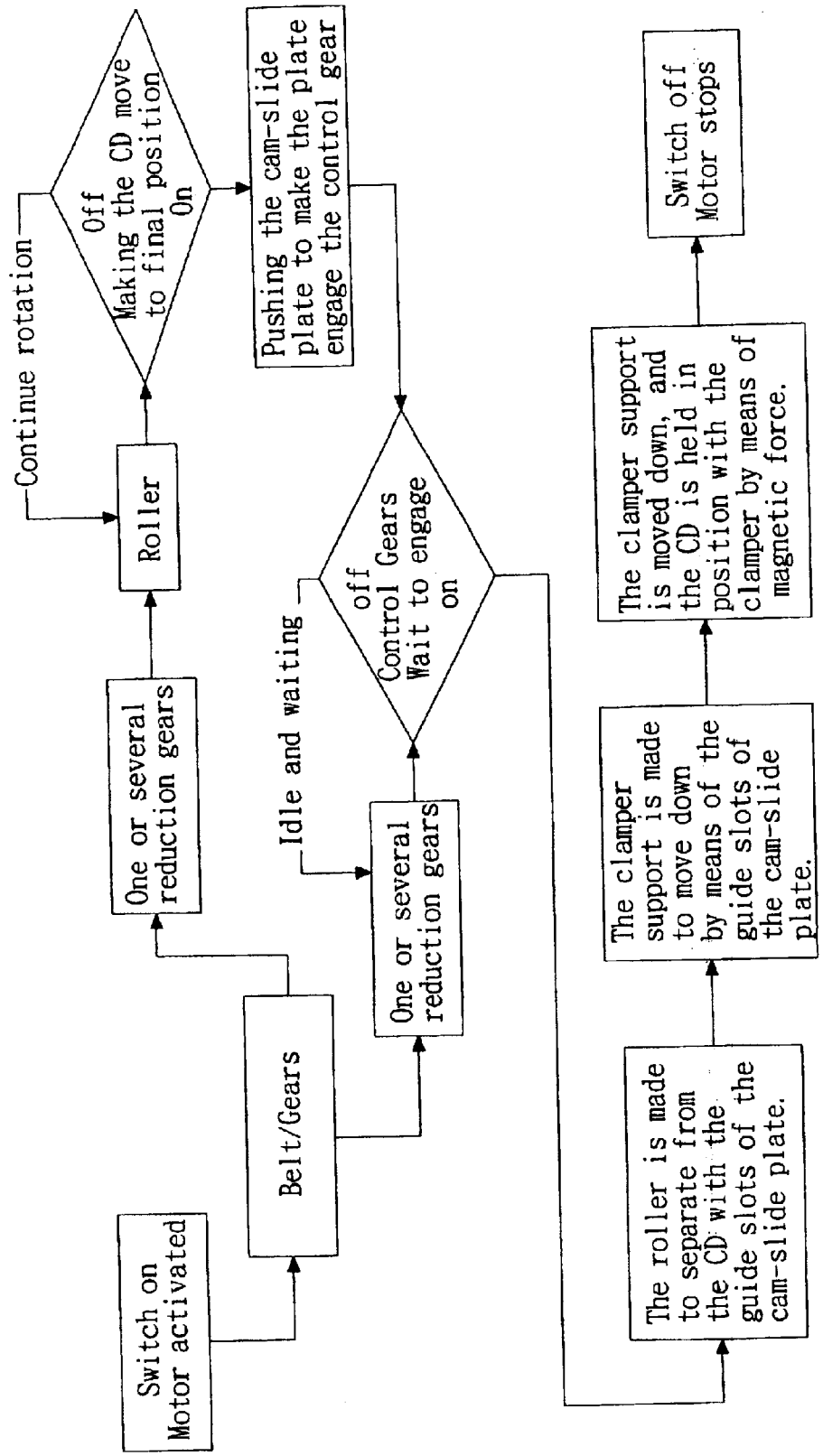
FIG. 19 is a flow chart of operation of the CD inserting mechanism of a CD player as described in the Background.
Figure 20:
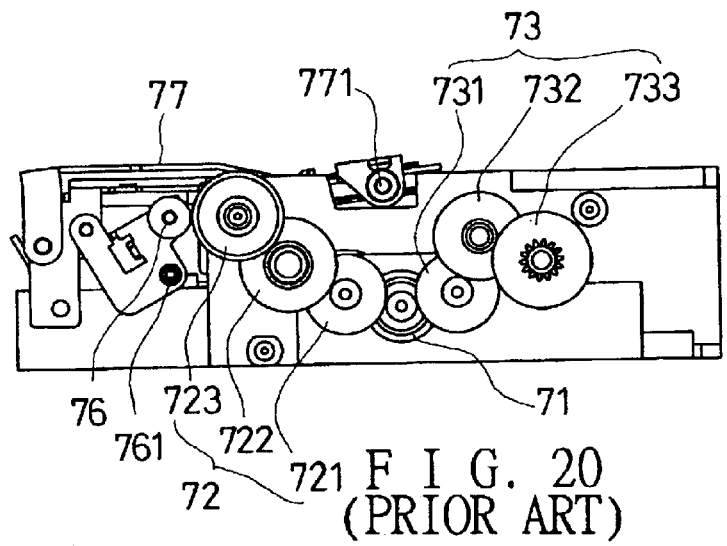
FIG. 20 is a cross-sectional view of the prior CD inserting mechanism.
Figure 21:
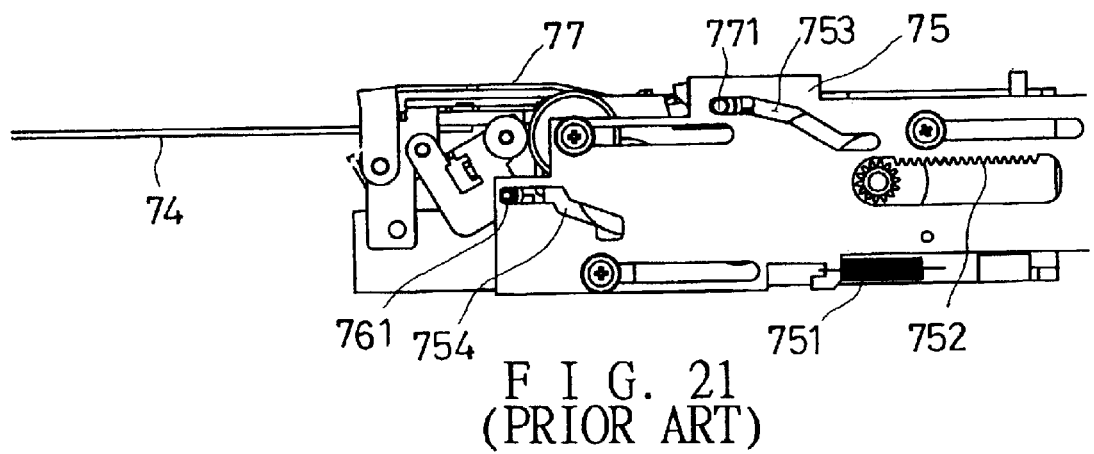
FIG. 21 is a side view of the prior CD inserting mechanism in operation.
Figure 22:
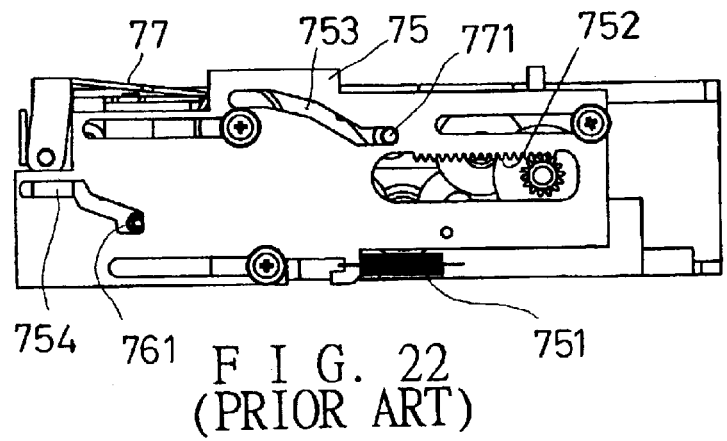
FIG. 22 is a side view of the prior CD inserting mechanism in operation.

Referring to FIGS. 1 to 3, a preferred embodiment of a CD inserting mechanism of a CD player in the present invention includes:

a motor 21, which is arranged near to an inlet of CD, and electrically connected to a micro-switch (not shown) such that it can be activated when a CD (compact disk) is inserted into the CD inserting mechanism;

a transmission gear set 22 disposed on one side of a main shell of the CD player or two transmission gear sets 22 disposed on two sides of the CD player; each transmission gear set 22 includes a rubber roller 221, and a tremor gear 222, and is fitted to a support 223; a belt 211 is connected to the motor 21 and the transmission gear set 22; thus, the CD can be moved towards inside of the CD player by means of the rubber roller 221 when the motor 21 is activated; guiding posts 224 are provided, which project from inward sides of the supports 223, as shown in FIGS. 8 to 11;

left and right toothed co-moving rods 31, 31, which are arranged above the inlet of CD in the CD player, and each of which has two holding posts 312, and a toothed portion, and which are engaged with a common gear 311 at the toothed portions such that when the CD is being moved along, the holding posts 312 move along at the same pace, and in turns, movement path of the CD is properly controlled, as shown in FIG. 6;

controlling plates 32, which are arranged at upper rear portion of the inner room of the CD player, and are connected to the main shell of the CD player by means of springs 321, as shown in FIG. 4; a connecting and detecting rod 33 is pivotally connected to a lower side of each controlling plate 32 so as to be capable of working as a lever; a detecting post 331 projects from a lower side of the other end of each detecting rod 33, as shown in FIG. 4, and 7;

a tracking toothed plate 41 arranged at one lateral side of the CD player or two tracking toothed plates 41, 41 arranged at left and right sides of the CD player; each tracking toothed plate 41 is connected to the main shell of the CD player at upper portion thereof by means of a spring 411; each tracking toothed plate 41 has a toothed portion 412 formed thereon to engage corresponding tremor gear 222; each tracking toothed plate 41 is formed with a guiding trench 413 on an inner side thereof;

L-shaped levers 42, which are pivotally connected to respective cam-slide plates 43 at first ends thereof; each combination of L-shaped lever 42 and cam-slide plate 43 is arranged near to inner sides of corresponding tracking toothed plate 41; second ends the L-shaped levers 42 are pivotally connected to corresponding ones of the guiding posts 224 of the support 223 to be capable of sliding within guiding trenches 413; each cam plate slide 43 is formed with a slide trench 431, as shown in FIGS. 4, 12, and 13;

a CD holding mechanism (clamper) 5 in the CD player; the CD holding mechanism 5 has a support 51 used for supporting it, and is pivoted to two lateral sides of the main shell of the CD player at first and second supporting parts 511 thereof, and has third supporting part 511 capable of sliding within the slide trench 431 of the cam plate slide 43; a holding base 52 is disposed in front of the support 51, as shown in FIG. 13.

Referring to FIGS. 1 to 3, a CD will come into contact with the micro-switch to make it activate the motor 21 when inserted into the CD inserting mechanism. And, movement of the motor 21 is transmitted to every transmission gear set 22 by means of the belt 211, and the CD is moved towards appropriate in-use position by means of the rubber roller 221. Because the toothed portions of the co-moving rods 31 engage the same gear 311, the holding posts 312 will move along at the same pace when the CD is moved along, and in turns, path of movement of the CD is properly controlled, as shown in FIG. 6. Because force exerted on the CD by the rubber roller 221 is greater than the pulling force exerted on the controlling plate 32 by means of the spring 321 and because the connecting and detecting rod 33 is in the form of a lever, the controlling plate 32 will be moved forwards by means of the connecting and detecting rod 33 when the CD is moved along to push the detecting post 331 of the connecting and detecting rod 33, and in turns, a space comes into existence for allowing the tracking toothed plate 41 to move therein.

Figure 9:
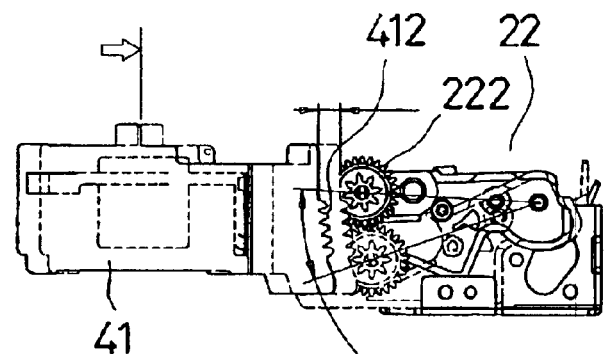
FIG. 9 is a partial side view of the CD inserting mechanism of a CD player in operation according to the present invention.
Figure 15:
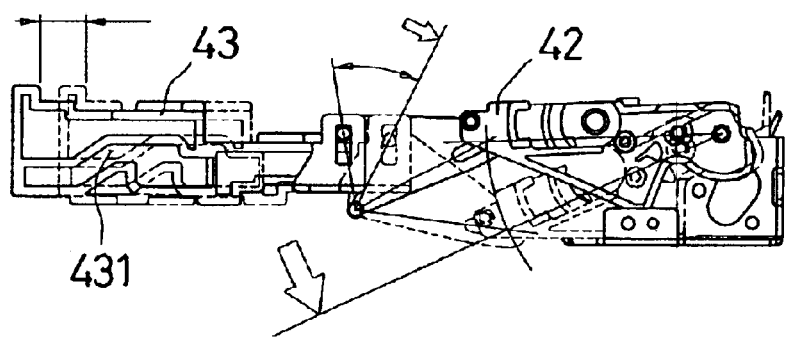
FIG. 15 is a seventh partial side view of the CD inserting mechanism of a CD player in operation.
Figure 16:
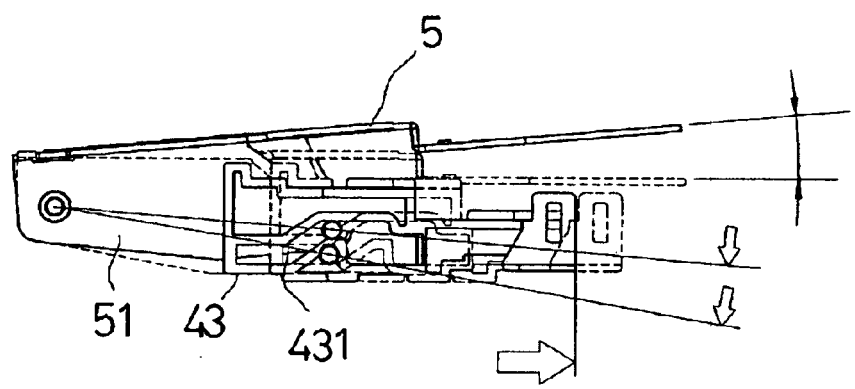
FIG. 16 is an eighth partial side view of the CD inserting mechanism of a CD player in operation.

The tracking toothed plates 41 will be made to move forwards to an active position by means of the springs 411 as soon as they are provided with the space by means of forward movement of the controlling plate 32, as shown in FIGS. 8, and 9. At the same time, the rubber roller 221 turns counterclockwise to convey the CD inwardly of the main shell of the CD player, and in turns, the supports 223 of the transmission gear sets 22 pivot counterclockwise downwards, as shown in FIG. 10, while the guiding posts 224 of the supports 223 come into engagement with guiding trenches 413 of the tracking toothed plates 41 to pull the tracking toothed plates 41 to appropriate position. And, the toothed portions 412 of the tracking toothed plates 41 come into engagement with the tremor gears 222 of the transmission gear sets 22, as shown in FIG. 11; the toothed portions 412 can come into engagement with the tremor gears 222 smoothly with unwanted disengagement between the teeth because the guiding posts 224 of the supports 223 have engaged the guiding trenches 413 to pull the tracking toothed plates 41 to appropriate position. Thus, the tremor gears 222 turn clockwise, and the transmission gear sets 22 move along a circular path (counterclockwise downwards) together with the toothed portions 412 of the tracking toothed plates 41, as shown in FIG. 12, and in turns, the rubber roller 221 separates from the CD so that the CD is no longer moved forwards, and can only be moved up and down within a space defined by the holding posts 312 of the co-moving rods 31.

When the transmission gear sets 22 are moving along a circular path downwards, the L-shaped levers 42 will transform up and down movement into left and right movement, which is then imparted to the cam-slide plates 43. Because the slide trenches 431 of the cam plate slides 43 are made so as to be capable of working like a cam, they make the support 51 of the CD holding mechanism 5 swing up and down with the first and second supporting parts 511 as the pivot, as shown in FIGS. 13 to 16.

The holding base 52 will be moved downwards together with the support 51 of the CD holding mechanism 5 in the downward stroke of the support 51. And, a magnet (not shown) is used to secure the CD in position. In addition, the cam-slide plates 43 will push the controlling plates 32 when they are moving, thus making the holding posts 312 of the co-moving rods 31 separate from the CD, making the CD free to turn, and not possible to fall off. The controlling plates 32 come into contact with a micro-switch to make the power to the motor 21 cut off as soon as the above operations are completed, and a reading mechanism 6 of the CD player can be activated for playing the CD as shown in FIG. 18.

From the above description, it can be easily understood that the CD inserting mechanism of a CD player in the present invention has advantages as followings:
1. The CD inserting mechanism has fewer parts than the conventional one, allowing cost of manufacturing and assembling of a CD player to be reduced.
2. The present CD inserting mechanism allows wider range of application of CD players, especially those that have to be positioned level for use.

What is claimed is:
1. A CD inserting mechanism of a CD player without a loading plate, comprising:
   a transmission gear set connected to a motor by means of a belt so as to be actuated with the motor; the transmission gear set having a rubber roller for conveying a compact disk to an in-use position inside a CD player; and
   a tracking toothed plate arranged at one lateral side of the CD player; the tracking toothed plate being capable of being pulled to an active position by means of a first spring when a compact disk is inserted into the CD player, thus making a toothed portion thereof coming into engagement with a tremor gear of the transmission gear set, and making the transmission gear set moving downwards along circular path together with the toothed portion of the tracking toothed plate so that the rubber roller separating from the CD so that the CD is no longer moved forwards; an L-shaped lever being provided to transform up and down movement into left and right movement, which is then imparted to a cam-slide plate, when the transmission gear set is moving downwards along a circular path; the cam-slide plate having slide trenches; on a course of the L-shaped lever transforming up and down movement into left and right movement when the transmission gear set is moving downwards along a circular path, the cam-slide plate making both a support of a CD holding mechanism and a CD holding base swing up and down with the slide trenches thereof, thus holding the compact disk in position.

* * * * *